United States Patent [19]
Rafson

[11] Patent Number: 5,256,208
[45] Date of Patent: Oct. 26, 1993

[54] PROCESS FOR REMOVING VOLATILE CONTAMINANTS FROM GRANULAR MATERIALS

[76] Inventor: Harold J. Rafson, 1852 Dale Ave., Highland Park, Ill. 60035

[21] Appl. No.: 769,829

[22] Filed: Oct. 1, 1991

[51] Int. Cl.$^5$ ............................................. B08B 3/00
[52] U.S. Cl. ...................................... 134/25.1; 134/10; 134/19; 134/26; 134/30; 134/31; 405/128
[58] Field of Search ...................... 134/10, 19, 25.1, 26, 134/30, 31; 423/DIG. 20; 405/128

[56] References Cited
U.S. PATENT DOCUMENTS

| | | | |
|---|---|---|---|
| 4,818,297 | 4/1989 | Holzmüler et al. | 134/30 |
| 4,892,664 | 1/1990 | Miller | 220/747 |
| 4,974,528 | 12/1990 | Barcell | 110/240 |
| 5,094,012 | 3/1992 | Rosenstock et al. | 34/32 |

OTHER PUBLICATIONS

Alperin et al., "Batch steam distillation/metal extraction treatment process" paper No. 91-22.6; Air and Waste Management Assoc., Jun., 1991.
U.S. EPA, "The Superfund Innovative Technology Evaluation Program", EPA/540/5-89/013, Nov., 1989, p. 109.
Sims, R. C., "Soil Remediation Technniques at Uncontrolled Hazardous Waste Sites", J. Air Waste Manage Assoc., vol. 40, No. 5, May, 1990, pp. 704-732.

Primary Examiner—Theodore Morris
Assistant Examiner—Zeinab El-Arini
Attorney, Agent, or Firm—Roland H. Shubert

[57] ABSTRACT

Volatile organic compounds and other volatile contaminants are removed from soils and granular solids by contacting the soil with steam at superatmospheric pressure and thereafter rapidly reducing the pressure by flashing off steam and vaporized contaminants leaving a cleaned soil product. The steam fraction containing the contaminant compounds is condensed and the contaminants can then be separated from the water for recovery or disposal.

32 Claims, 5 Drawing Sheets

PROCESS FOR REMOVING VOLATILE CONTAMINANTS FROM GRANULAR MATERIALS

BACKGROUND OF THE INVENTION

1. Field of the Invention

This invention relates generally to a process and apparatus for the remediation of contaminated soils, sediments and sludges, and other granular and particulate materials.

More specifically, this invention relates to a process for removing those contaminants which display a significant vapor pressure at elevated temperatures from soils and like materials and to apparatus for carrying out that process. In one particular embodiment, this invention is directed to the cleaning of soil by the removal of volatile organic compounds such as chlorinated solvents, petroleum hydrocarbons and pesticides therefrom.

2. Description of the Related Art

The contamination of soils, sediments and like materials with industrial solvents, petroleum hydrocarbons and other organic liquids is of increasing concern. Contamination of soil by such compounds occurs in a variety of ways including spills and discharges during processing, loading, storage and transport, percolation into the soil from waste lagoons and landfills, pipeline breaks, leakage from underground storage tanks, agricultural uses and from dumping. One harm from such contamination is in the degradation of ground water and ground water aquifers especially those used as a source of potable water. In extreme instances, pollution of ground water has been so extensive as to preclude use of an aquifer as a municipal water supply. A second harm occurs when compounds migrate-or volatilize and threaten the health and wellbeing of nearby residents.

Regulations governing the treatment of contaminated soils generally require excavation and treatment of those soils contaminated with more than 1,000 ppm total petroleum hydrocarbons (TPH) by weight. Soils treated to levels below 100 ppm can be disposed of in a non-toxic landfill and, if treated to a level below 10 ppm, can be returned to the ground from which the soils were taken. Certain hazardous and toxic compounds, benzene, toluene and xylenes for example, are subject to far more stringent requirements and must be removed from soils to a level below 5 ppb before the soil is returned to the ground.

There are numerous approaches to the treatment of soils to remove contaminants. One common approach is to pile the soil on a prepared pad arranged to allow for air or other gas to be drawn downwardly through the pile. The air as it passes through the soil strips volatile organic compounds from the soil and carries those compounds with it. Air is collected from pipes located in the soil pile and is then treated to remove the volatile organic compounds. The concentration of stripped organic compounds carried in the exiting air stream is quite low; often on the order of a few parts per million. A very large volume of air must then be treated during the course of a soil remediation project. Typical approaches to the treatment of such air streams includes passing the air through a column containing an adsorbent solid such as activated carbon or by fume incineration of the contaminant compounds. This latter approach, although applied to an air stream resulting from the stripping of volatile organic compounds from ground water rather than from the soil itself, is illustrated by U.S. Pat. No. 4,892,664. This is a slow and lengthy process requiring a large amount of space and energy.

Incineration of contaminated soils has been used. It is technically feasible to destroy most contaminant compounds by incineration but the technique is not practical for large soil volumes and is very costly requiring large quantities of fuel. All of the soil must be raised to incineration temperatures leaving a product which is hot and difficult to handle and to transport.

U.S. Pat. No. 4,974,528 describes what might be called a modified incineration process. Patentee uses a vehicle mounted, inclined rotary kiln for removing hydrocarbon contaminants from soils. Contaminated soil is fed into the upper end of the kiln and a burner assembly is located at the lower, or discharge, end of the kiln. Soil is heated to temperatures as high as 345° C. as it passes through the kiln resulting in the volatilization or burning of the lighter fraction hydrocarbons from the soil. Combustion gases are removed from the upper kiln end and are drawn through a bag house for the removal of fines. The cleaned gases are then reheated and passed to a catalytic incinerator to burn the remaining hydrocarbons in the gas.

A number of other approaches to soil remediation have been compiled by the Environmental Protection Agency in a publication entitled "The Superfund Innovative Technology Evaluation Program: Technology Profiles"; EPA/540/5-89/013, November 1989. Among the processes listed therein, the following are considered worthy of note. A vapor extraction system under development by American Toxic Disposal, Inc of Waukegan, Ill. employs a fluidized bed to remove volatile contaminants from soils and similar materials. Direct contact between the soil and a gas from a gas fired heater at a temperature of about 320 F. volatilizes water and contaminants from the soil into the gas stream. Particulates are first removed from the gas stream by means of a cyclone separator and baghouse. The gas stream from the baghouse is cooled in a venturi scrubber, countercurrent washer and chiller and is then passed through a carbon bed to adsorb the remaining contaminants. Most of the soil fed to the fluidized bed is recovered as a clean, dry dust cleaned of volatiles. Other by-products include a small quantity of sludge resulting from clarification of the water used in the process; quantities of spent adsorbent carbon; a wastewater stream that might require further treatment; and small amounts of baghouse and cyclone dust. It is stated that the process can remove polychlorinated biphenyls, polynuclear aromatic hydrocarbons, Volatile inorganics and some pesticides from soils.

Another process described in the Environmental Protection Agency publication is a soil washing system which has been demonstrated by Biotrol, Inc. of Chaska, Minn. Contaminated soil is subjected to attrition washing during which highly contaminated fine soil particles are separated from the coarser sand and gravel. The bulk of the soil is discharged as a clean washed product leaving a process water which contains the highly contaminated fine particles as well as dissolved contaminants. Thereafter, the fine solids are dewatered to obtain a thickened slurry and a clarified process water stream. Both the slurry and the clarified water require a secondary treatment before discharge which may be, for example, a biodegradation process.

The technique was developed to clean soils contaminated with wood preserving chemicals.

Yet another approach to the cleaning of contaminated soils was reported in a paper presented at the 84th Annual Meeting and Exhibition of the Air and Waste Management Association at Vancouver, British Columbia in June, 1991. The paper, entitled "Batch Steam Distillation/ Metal Extraction Treatment Process for Contaminated Superfund Soils", by E. S. Alperin et al of the IT Corporation, Knoxville, Tenn., which process was earlier reported in the Environmental Protection Agency publication referred to above. The paper describes a two-stage process, which in a first stage removes volatile organic compounds from a slurry of the contaminated soil by injecting low pressure steam directly into the slurry contained within a closed vessel. Steam containing contaminant compounds is taken overhead from the vessel and is condensed to recover the volatile organic compounds. After the steam distillation is complete, concentrated hydrochloric acid is added to the soil slurry to solubilize the metals. The acid solution is then separated from the soil which is thereafter washed several times with water, dewatered, and dried.

All of the soil remediation processes of the prior art have serious drawbacks. The use of air or some other gas to strip contaminant compounds from soils takes a long time, produces an uneven result as uniform percolation of air through the soil cannot easily be achieved, and requires the secondary treatment of very large air volumes. Incineration is very costly, produces a product that is difficult to handle and, in some instances, requires contaminant removal from the incinerator flue gas. The fluidized bed system also is energy intensive, requires extensive treatment of the exiting gas stream and leaves the soil in a hot dry, dusty state while producing several by-product streams which require further treatment. All incineration systems may also contribute to other regulated gaseous contaminants being released from fuel burning, such as $SO_x$ and $NO_x$ and $CO_2$ which may have effects on global warming. Soil washing using attrition washing is necessarily limited to soils which are predominately sand and gravel and results as well in a silt or clay suspension which requires further treatment and is difficult to dewater. Batch low pressure steam distillation of slurries is high in energy use, limited in treatable compounds, and requires the handling of water-soil slurries with all the attendant difficulties entailed therewith.

There is clearly a need for additional simple, effective ways to clean up soils contaminated with solvents, hydrocarbons, and the like to reduce residual contaminants to low levels with efficient fuel usage without producing as well large volume byproduct liquid and/or gas streams requiring purification. Further, it is of considerable advantage to obtain as a product a soil suitable for replacement in the ground without further conditioning or treatment, which none of the above mentioned alternatives accomplish.

SUMMARY OF THE INVENTION

A system is provided for the cleaning of granular or particulate solids as, for example, soils by the removal of contaminants therefrom to obtain a cleaned soil product ordinarily suitable for replacement in the earth without further treatment or conditioning and to recover as well the contaminating compounds for reuse, further treatment or destruction. Soil contaminated with industrial solvents, petroleum hydrocarbons and other organic or inorganic compounds which display a significant vapor pressure at temperatures modestly above the boiling point of water are removed from the soil by contact with steam at superatmospheric pressure in a vessel. Either a one-stage or two-stage process is followed. In a first stage, soil and contaminants are heated and pressured by steam at superatmospheric pressure, and optionally, steam may be vented at that pressure. In a second stage, the pressure within the vessel is reduced to atmospheric or subatmospheric pressures by flashing off steam and volatilized contaminant compounds leaving behind a cleaned soil product. Flashed steam and contaminants are condensed and the contaminant compounds may then be separated from the water and recovered or otherwise disposed of. Process efficiency may be increased and a relatively cool soil product may be obtained by selecting the lower pressure level to be substantially below atmospheric.

Hence, it is an object of this invention to provide a method and means for treating contaminated soils, sediments, sludges and other granular and particulate materials to remove the contaminating materials therefrom.

Another object of this invention is to remove from soils and like solids contaminant organic and inorganic compounds which display a significant vapor pressure at temperatures at or above the boiling point of water and to obtain a cleaned soil product.

Yet another object of this invention is to provide apparatus suitable and effective for carrying out the described method.

Those and other objects of this invention will be apparent from the following detailed description of the invention.

BRIEF DESCRIPTION OF THE DRAWING

Specific embodiments of the invention are illustrated in the drawing in which.

DETAILED DESCRIPTION OF THE INVENTION

All embodiments of the invention hereafter described function to remove from granular or particulate solids such as soils those contaminants having a significant vapor pressure or degree of volatility. When a soil or other solid carrying a volatile organic compound or similar contaminant is exposed to steam at superatmospheric pressure within a confined space such as in a contacting zone or vessel, the total pressure of the vapor within the system at equilibrium conditions is the sum of the partial pressures of the contaminant compounds and of the water vapor or steam. Adjustment of the steam pressure within the contacting zone indirectly adjusts the temperature as well to obtain the desired contaminant partial pressure. Process control is obtained by adjusting the steam pressure, the ratio of steam to soil, the pressure to which the steam within the vessel or contacting zone is flashed and the time allotted for each of the foregoing steps. By adjusting those operating parameters relative to the types of contaminants present and the partial pressures developed by those contaminants at process temperatures, substantially complete removal of contaminants, for example, common volatile organic compounds such as petroleum fuels, can readily be obtained.

In describing the invention, the term "soil" will be deemed to include ordinary soil, sediments, silts, clays and other granular and particulate solids capable of adsorbing or absorbing contaminant compounds, whether those contaminants are naturally occurring or are the result of human activities. Soil contaminants amenable to removal by the process of this invention include that group of materials commonly referred to as volatile organic compounds and include as well all of those soil contaminants displaying a significant partial pressure in the presence of steam at superatmospheric pressures. For the purposes of this disclosure, the term "volatile organic compounds" will be taken to include all of those compounds which display a partial pressure greater than 2 mm Hg at a steam partial pressure of 10 atmospheres. That definition is to be taken to specifically include such materials as pesticides, herbicides, and industrial and agricultural products and by-products and wastes which ordinarily might not be considered to be volatile organic compounds.

Figure 1:
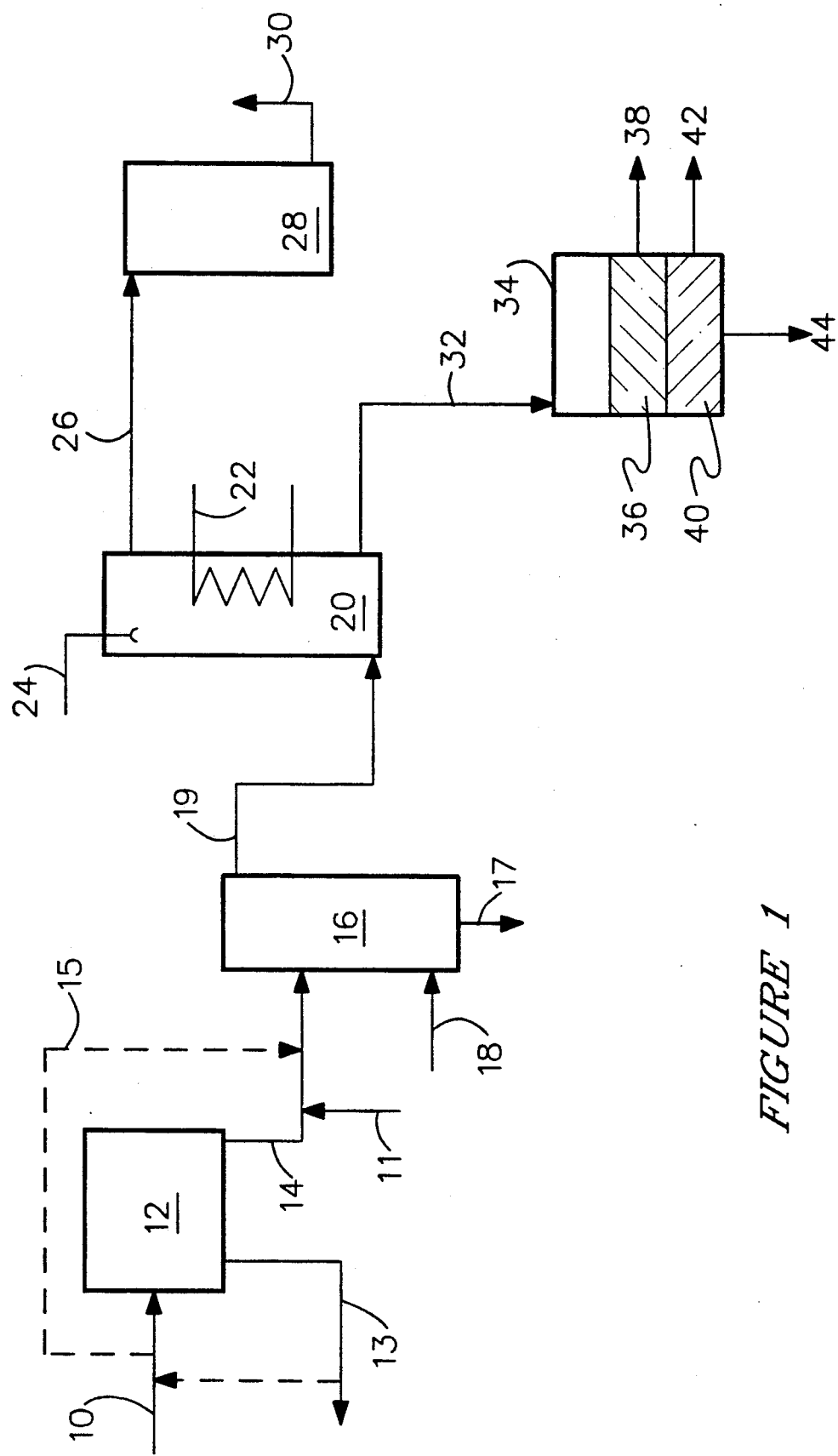
FIG. 1 is a schematic flow diagram illustrating one embodiment of this invention.

Referring now to FIG. 1, there is schematically depicted one embodiment of this invention; specifically that of a one-stage batch process. A supply of contaminated soil 10 is provided, if necessary, to soil preparation means 12 where it is subjected to a physical treatment to condition the soil for further processing. Conditioning of the as-supplied soil serves to break up lumps and remove rocks, debris, and the like which would interfere with further transport and processing of the soil. Those materials are removed from preparation means 12 by way of means 13 and may be discarded if they are not adsorbent and therefore not sufficiently contaminated to require further treatment. Alternatively the rocks and other oversize material may be crushed and returned to soil supply 10 for treatment. Conditioned soil from means 12 is then transported by way of conveyance means 14 to a contacting zone comprising vessel 16 wherein the soil is treated to liberate and remove volatile contaminants. The moisture content of the conditioned soil may be adjusted if necessary by the addition of water. That may be conveniently accomplished by introducing a metered water stream 11 into the soil carried by conveyance means 14. When the soil or granular material being treated does not require conditioning, it may bypass preparation means 12 by way of conveyance means 15.

Liberation and removal of volatile contaminants from the soil is accomplished by introducing steam at superatmospheric pressure from source 18 into zone 16 and allowing the steam and soil to remain in contact for a sufficient time, at least a second, to reach a predetermined temperature and pressure objective for the compounds to be volatilized. At those conditions contaminant compounds contained in the soil exhibit an elevated vapor pressure. The vaporized contaminants tend to travel with the vaporized water from within the soil and from interstices between soil grains into the gaseous body of the steam.

The steam pressure applied within vessel 16 may be varied according to the type of soil being treated, the vapor pressure characteristics of the compounds contaminating the soil, and upon the concentration of contaminant and the degree of contaminant removal which is necessary or desired. In most instances, the steam pressure applied within vessel 16 need not exceed about 10 atmospheres, or about 165 psia. That pressure corresponds to a temperature of about 185° C. assuming saturated conditions. In some instances, it may be desirable to operate at even higher steam pressures. The ratio of steam to soil on a weight basis required for proper operation of the process depends on a number of factors including the characteristics of the soil and the soil contaminant type and concentration, the quality and pressure of the steam utilized, and the degree of contaminant removal required. Broadly speaking, the steam/soil ratio required for efficient operation of the process may range from about ¼ to 1/50 on a weight basis. After the steam and soil have been in contact for a sufficient period of time, the pressure within zone 16 is rapidly reduced to some lower level; in most instances to atmospheric or lower. The contact time between steam and soil can be quite short, just sufficient for the soil and the steam to approach or reach the temperature objective. Pressure reduction is accomplished by flashing the steam and transporting it together with the contaminant compounds which carry along through conduit means 19 to atmospheric or low pressure condensing zone 20. A cleaned soil product is then discharged from zone 16 by way of means 17.

Zone 20 is conveniently a condenser in which the flashed steam is cooled and condensed by contact with indirect heat exchange means 22. Alternatively, condensing zone 20 may employ direct contact heat exchange in which the entering steam is contacted with a water spray 24. Combinations of indirect contact heat exchange means and direct heat exchange may also be used. The use of a direct water spray to condense the steam does have the disadvantage of increasing the volume of water contacting contaminants and thus requiring further treatment before disposal. Depending upon the type of soil being treated, in particular its fineness, there may be some carryover of particulates with the flashed steam. In those instances, it may be advantageous to employ the condensing means described in U.S. Pat. No. 4,284,609 which were designed to remove particulates concurrently with condensation of water vapor carried by a gas stream. Particulates may also be removed, if desired, from the gases and vapors carried in line 19 using conventional cyclones or bag houses.

Non-condensibles, primarily air, are taken from the condensing zone by way of line 26 and are passed to a treatment means 28 which removes residual volatile organic compounds and similar contaminants and discharges a cleaned gas stream 30. Treatment means 28 may comprise a contacting column containing a bed of adsorbent material such as activated carbon through which the gas is passed or it may comprise a combustion means. Preferably, however, the non-condensible gas stream 26 is cleaned by use of a mist scrubbing process for removing volatile organic compounds from gas streams which is disclosed in U.S. Pat. No. 5,017,351. In some instances it may be appropriate to treat the vapors in line 19 as if they were non-condensible gases, bypassing condensing zone 20 and routing the vapors directly to line 26.

Condensate from zone 20 flows by way of line 32 to collection means 34 which conveniently may comprise a decanting tank. In many instances, the soil contaminants are liquids which are essentially immiscible in water. Such contaminants are usually of different specific gravity, often lighter than water and so the condensate will separate into two liquid phases. The top phase 36 will ordinarily comprise the soil contaminants which are removed from tank 34 by way of line 38 for recovery or incineration or other suitable disposal or reuse. The lower liquid phase 40 will ordinarily comprise water and is removed from tank 34 by way of line 42 and may be further treated to remove residual contaminants before discharge or recycle to the process. Condensate flowing into decanting tank 34 may also contain solids which will accumulate at the bottom of tank 34. Discharge means 44 are provided at the bottom of tank 34 to remove those accumulated solids.

In some instances, it is advantageous to modify the embodiment just described in order to obtain a more complete level of contaminant removal. In this instance, zone 16 is pressurized with steam as before and, during steam addition or after steam and soil have reached the temperature objective, the flow of steam to zone 16 is continued for a pre-set period of time. Simultaneously, steam is bled from zone 16 through conduit 19 at a rate such that the pressure and temperature within zone 16 are maintained at the predetermined level. At the end of the pre-set time period, steam flow is stopped and the pressure within zone 16 is rapidly reduced to a lower level in the manner before described.

Figure 2:
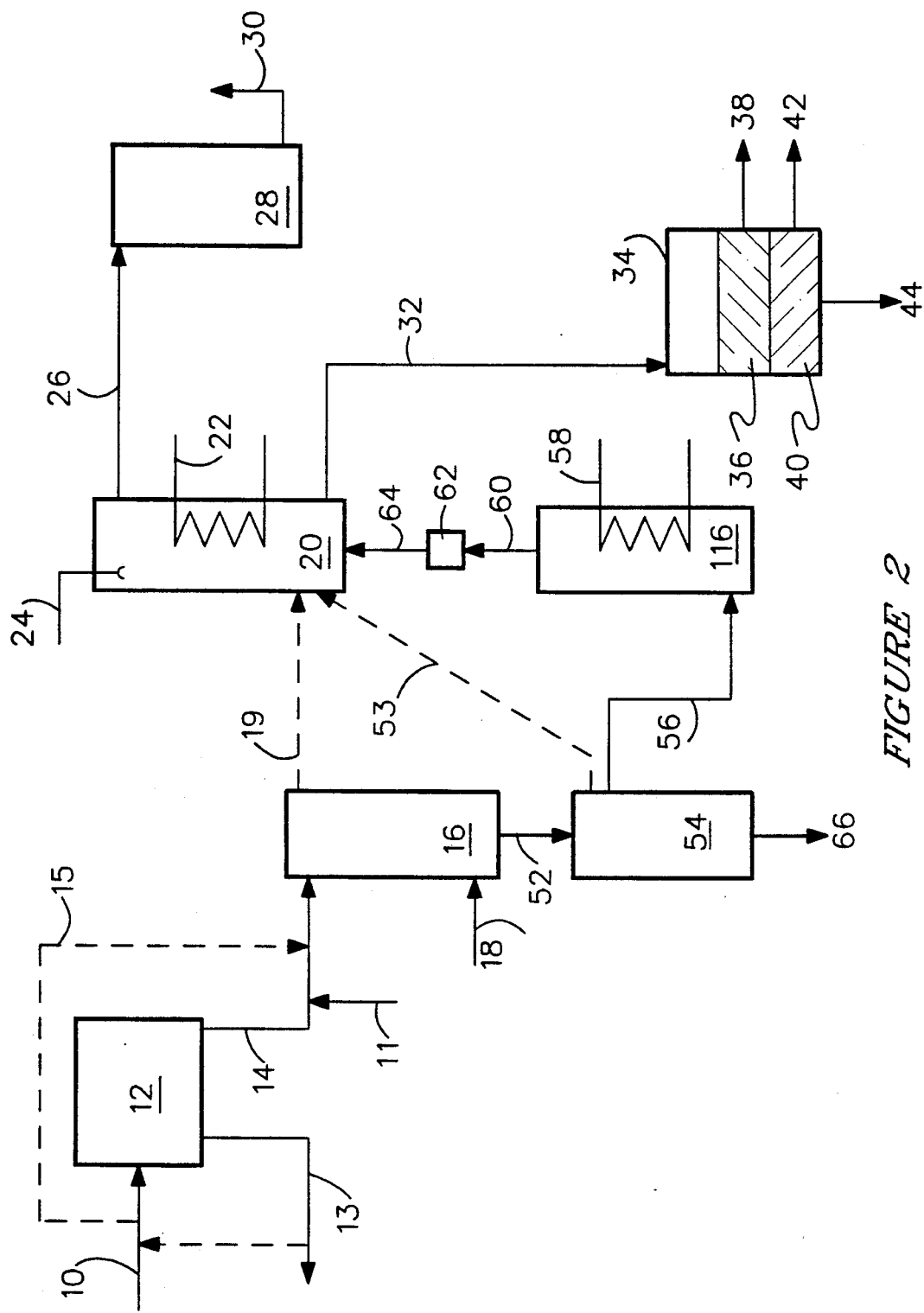
FIG. 2 is a schematic flow diagram of a second embodiment of the invention illustrating a two-stage batch process.

FIG. 2 is a schematic representation of another embodiment of the invention; specifically a two-stage batch process. In this instance, contaminated soil 10 is treated in preparation means 12, if necessary, and is thereafter transported to contacting zone 16 as was previously described. Steam from source 18 is introduced into zone 16 until the temperature and pressure within the zone reach the desired levels.

After the targeted temperature and pressure within zone 16 is reached, further processing can take any of four approaches.

In the first approach, the contents of zone 16 are discharged through transport means 52 into zone 54. Zone 54 is maintained at a substantially lower pressure than is zone 16 and that lower pressure may be atmospheric pressure or slightly above, or may be subatmospheric pressure. In those circumstances where the pressure in zone 54 is atmospheric or slightly above, steam and other gases including volatilized contaminants are flashed by way of conduit 53 into atmospheric condensing zone 20. That portion of the steam and other gases which do not condense in zone 20 are passed by means 26 to treatment means 28 as was previously described.

In the second approach, zone 16 is discharged through means 52 into zone 54 which is maintained at subatmospheric pressure. Steam and other gases including volatilized contaminants are flashed from zone 54 by way of line 56 into subatmospheric condensing zone 116. Steam and vapor entering zone 116 are cooled and at least partially condensed by contact with indirect contact heat exchange means 58 or by direct contact with a water spray or a combination of both as was described in relation to condensing zone 20. That portion of the steam and other gases which do not condense in zone 116 are passed by way of line 60 to compression means 62 which may comprise a mechanical compressor, a steam eductor or other suitable vacuum producing means. The compressed gases, now at a pressure of at least atmospheric, are passed by way of line 64 to condensing zone 20 for further treatment as was previously described. Condensate from zone 116 is passed to decanting tank 34 by way of line 68 where it merges with condensate from zone 20 delivered to tank 34 by way of line 32. A cleaned soil product is discharged from the low pressure contacting zone 54 by means 66.

In the third approach, steam and contaminants from zone 16 are bled to condenser 20 by way of conduit 19 during or following the steam pressuring step. Thereafter, the procedure of the first approach is carried out.

In the fourth approach, steam and vaporized contaminants from zone 16 are bled to condenser 20 by way of line 19. After a desired amount of steam and contaminants are so transferred, then zone 16 is discharged into zone 54 which is at subatmospheric pressure. Thereafter, the steps described in the second approach are followed.

The use of subatmospheric pressures in zone 54 provides benefit in that more complete removal of contaminants is obtained and the treated soil is cooled to a level whereat it can be conveniently handled and safely replaced in the ground from which it was taken. The final absolute pressure reached in zone 54 is preferably below 0.5 atmosphere and preferably in the range of about 0.1 to 0.3 atmosphere. A final pressure of about 0.2 atmosphere absolute, equivalent to about 12 psi vacuum, will provide a cleaned soil product cooled to about 60° C. At that temperature the soil can be easily handled and replaced in the ground without burn hazard to humans or animals which might come into contact with it.

Figure 3:
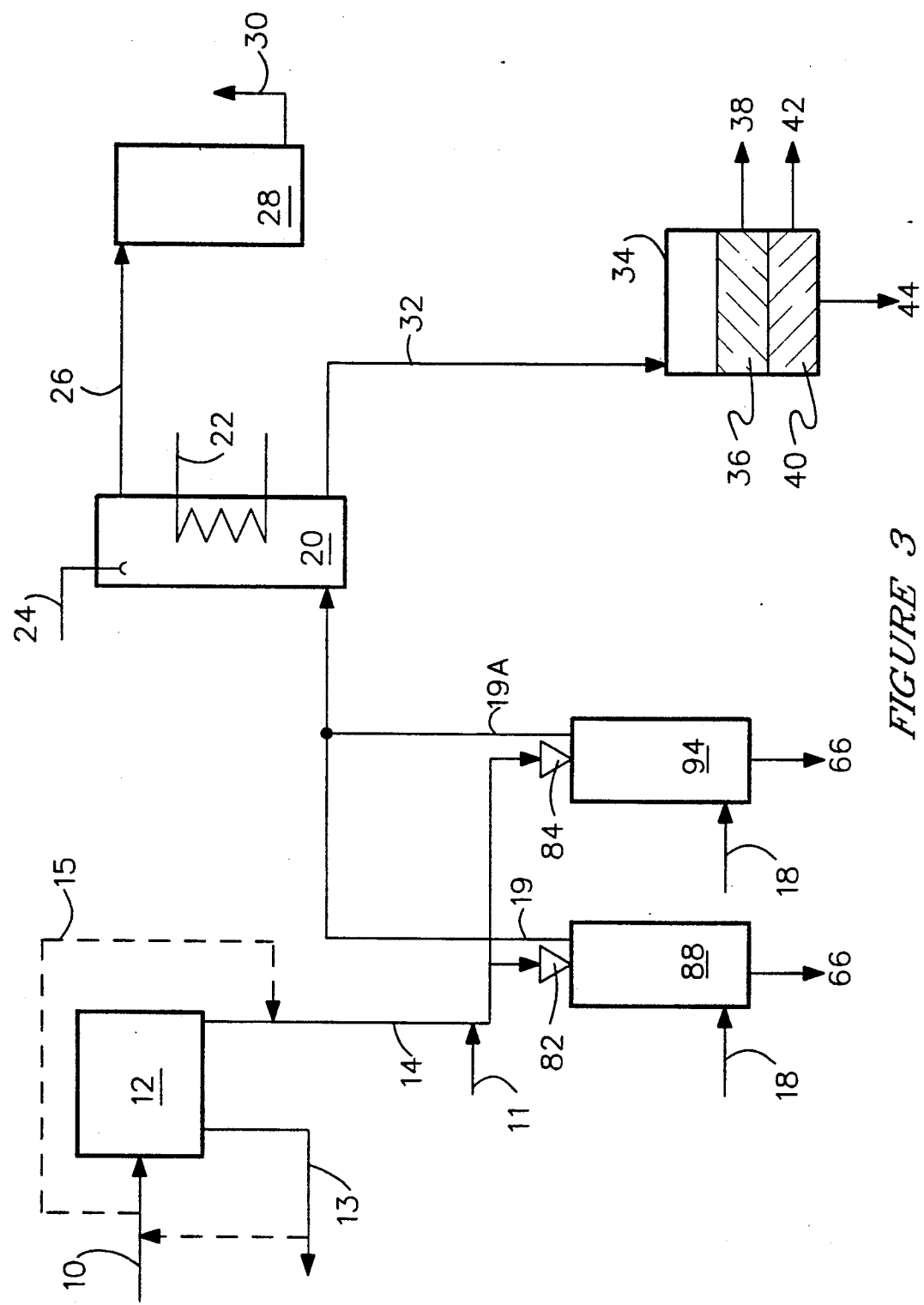
FIG. 3 depicts another embodiment of the invention adapted to operate on either a batch or batch-continuous basis.

Referring now to FIG. 3, there is shown a schematic representation of another embodiment of the inventive process which may be operated on either a batch or a batch-continuous basis. As was described in connection with the FIG. 1 process, contaminated soil 10 is conditioned for further processing, if needed, in preparation means 12. Conditioned soil, free of rocks, debris and the like and adjusted in moisture content if necessary, is transported from the preparation means by means 14. Means 14 is optionally arranged to also function as a heat exchanger to thereby pre-heat the conditioned soil before it is further processed. Heating of the conditioned soil may be accomplished using the flue gas from a steam generating boiler as the source of heat. Flue gas is preferably passed in indirect contact heat exchange with the conditioned soil in conveyer 14 and is thereafter exhausted to the atmosphere.

Means 14 is arranged to transport soil alternately into means 82 and 84. Means 82 is arranged with a valved feeder at the bottom thereof discharging into a first reactor 88. Likewise, means 84 is similarly equipped with a valved feeder which discharges into a second reactor 94. The first reactor 88 and the second reactor 94 are of similar construction. Each comprises a closed vessel adapted to contact a charge of soil with steam at superatmospheric pressure. Steam to charge the reactors 88 and 94 is produced by a boiler or other convenient source and is conveyed from the boiler via means 18 for alternating supply to the reactors.

In operation, a charge of soil from means 82 is introduced into the first reactor 88. Reactor 88 is then sealed and steam at superatmospheric pressure, suitably at a pressure of five atmospheres or greater, is allowed to flow into the reactor from the boiler by way of means 18. The soil charge within reactor 88 rapidly approaches the temperature objective with the incoming steam vaporizing the moisture and contaminant compounds contained in the soil. Steam flow is ended when the pressure within reactor 88 reaches the desired level which may be the pressure of the steam source. Thereafter, the pressure within reactor 88 is rapidly reduced by flashing off steam and other gases, including vaporized contaminants, through conduit 19 to condenser means 20 which may be of the kind described earlier in relation to the discussion of FIGS. 1 and 2. The flashing of steam from reactor 88 is allowed to continue until the pressure within the reactor approaches that of condenser 20 which is ordinarily about atmospheric or slightly above. The soil charge within reactor 88 is then dumped through closed conduit means 66.

Meanwhile, means 84 will be loaded with a charge of conditioned soil from transport means 14 and that charge is then introduced into the second reactor 94. Means 18 provides steam flow to reactor 94 until it reaches the desired pressure. Pressure within reactor 94 is then rapidly reduced by flashing off steam through line 19A to condenser 20 in similar fashion to that employed with reactor 88. After the pressure within reactor 94 has dropped to essentially that of condenser 20, the soil charge is dumped by means 66. The cycle of charging a reactor with soil, pressurizing the soil charge with steam, flashing off the steam and vaporized contaminants, and dumping the soil, is preferably adjusted between the first reactor 88 and the second reactor 94 such that an essentially continuous mode of operation may be maintained upstream and downstream of the reactors. That is to say it is preferred to operate soil preparation means 12 in a continuous, steady state manner. Likewise, operating advantages are obtained by cycling the two reactors in a sequential fashion such that the steam demand is relatively constant.

Non-condensible gases are removed from condensing zone 20 by way of line 26 and are treated in means 28 as has been previously described. In an alternative mode of operation, reactors 88 and 94 may have steam and contaminants bled to condenser 20 during or following the steam pressurizing step.

Figure 4:
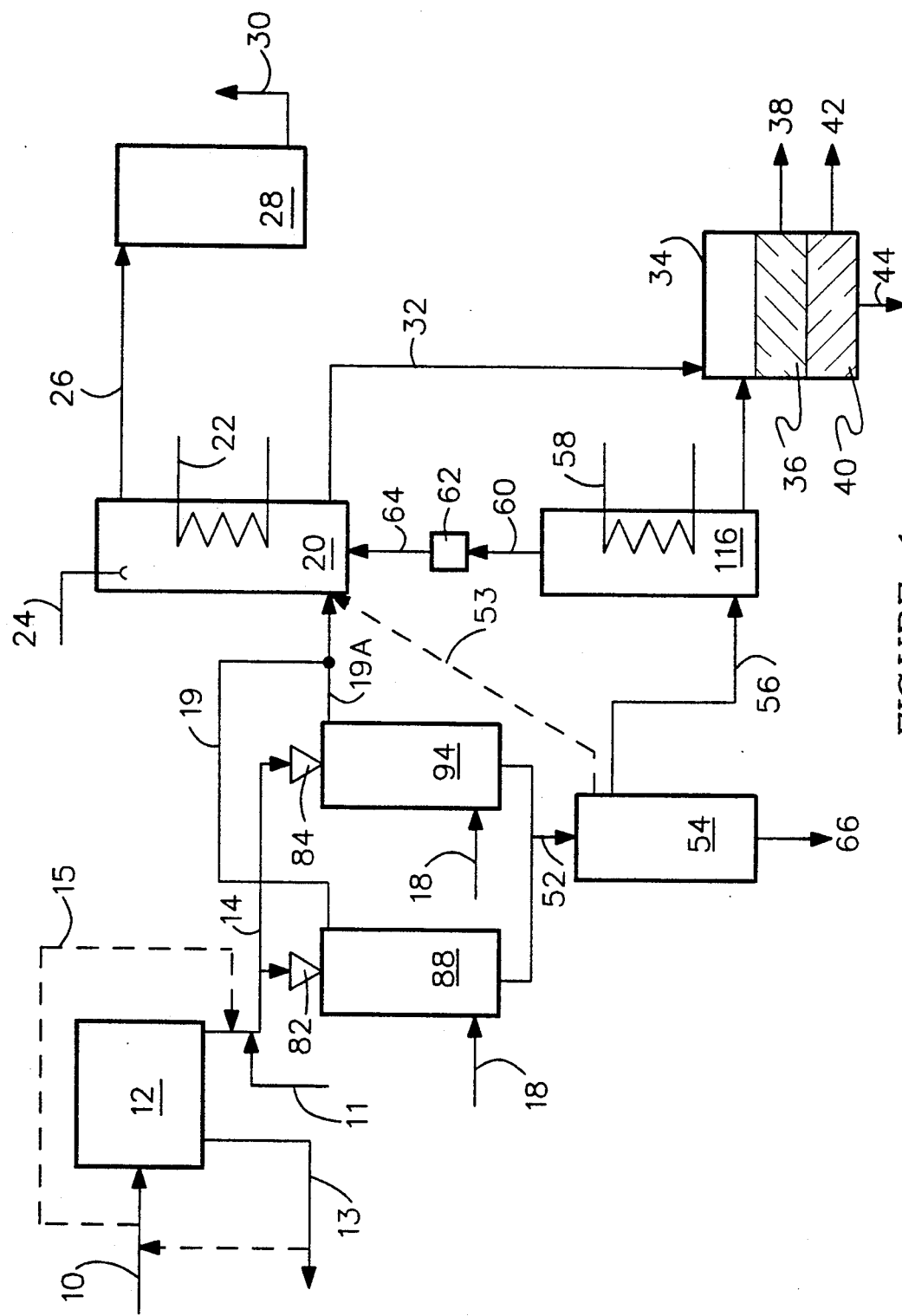
FIG. 4 depicts yet another embodiment of the invention adapted to operate on a continuous basis.

Referring now to FIG. 4, there is depicted a process much the same as that of FIG. 3 except that reactors 88 and 94 are alternately discharged to reaction chamber 54 rather than being dumped directly to the atmosphere. Chamber 54 is maintained at a pressure substantially below that of reactors 88 and 94 and preferably at a subatmospheric pressure as was described in relation to the process of FIG. 2. As in the embodiment of FIG. 2, steam and vaporized contaminants from zone 54 are passed to subatmospheric condensing zone 116 via line 56 or may be bled to condensing zone 20 by way of conduit means 53.

In most instances, the discharged soil is suitable for replacement in the ground without further treatment or conditioning. Substantially complete removal of all relatively volatile contaminants has been obtained. The soil is relatively cool; the temperature being dependent upon the level of vacuum obtained in chamber 54 but typically is on the order of 55° to 60° C. at a pressure of 2 to 3 psia. It is desirable that the treated soil product retain sufficient residual moisture as to allow for easy handling. Bone dry soil dusts badly and is difficult to transport and replace in the ground. The level of residual moisture can be indirectly controlled by adjusting the moisture content of the conditioned soil and the subsequent processing steps may be operated in a manner wherein there is little significant net gain or loss of soil moisture. It is generally preferred that the moisture content of the treated soil product be within the range of about 5% to about 20% by weight. Dusting becomes a problem as the soil moisture is depleted to about 5% and lower while many soils tend to lump and ball as the moisture level approaches and exceeds about 20%.

Figure 5:
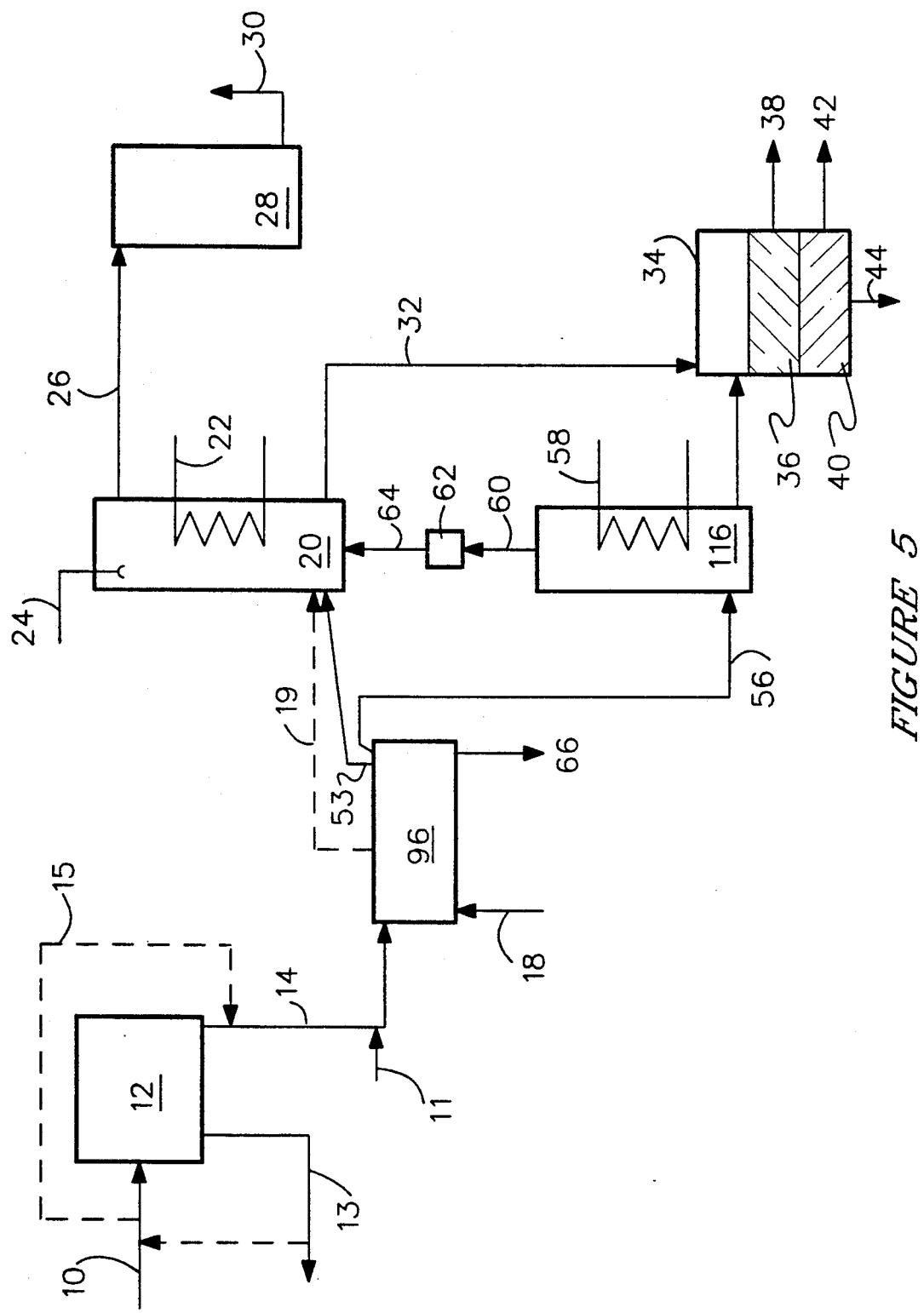
FIG. 5 illustrates a truly continuous embodiment of the process of this invention.

FIG. 5 depicts a fully continuous embodiment of the process of this invention. In this embodiment, a reactor vessel 96 is arranged for the continuous transport of a conditioned soil feed stream 14 to one end of the vessel. Steam at superatmospheric pressure from source 18 is introduced into the feed end of the vessel to mix with the soil. Steam and vaporized contaminants are flashed from the other end of the vessel and a cleaned soil product 66 is discharged as well from that vessel end. The steam and vaporized contaminants may be passed to atmospheric pressure condensing zone 20 by way of line 53 or may be passed instead to subatmospheric condensing zone 116 by way of line 56. A steam and contaminant bleed stream 19 may be taken from a place intermediate the feed and discharge points and passed to condensing zone 20. In other respects, the process is as depicted and described in relation to the other embodiments.

The following examples will serve to illustrate the efficiency and practicality of the process in the removal of some common soil contaminants.

EXAMPLE 1

A sample quantity of contaminated soil was prepared by thoroughly mixing with the soil an amount of #2 fuel oil to obtain a calculated fuel oil contaminant concentration of approximately 9,280 ppm by weight. That sample was split into a number of portions for testing with the inventive process.

In a first test, a portion of the soil sample was placed into a pressure vessel and the vessel was pressurized with steam to a gage pressure of about 165 psia. Steam and vaporized fuel oil was then flashed from the vessel to a subatmospheric pressure of 3 psia and the cleaned soil product was removed for analysis. It was found that the cleaned soil contained 8.7 ppm fuel oil as determined by gas chromatography techniques. That calculates to a 99.9% removal of the hydrocarbon contaminants.

EXAMPLE 2

Another portion of the contaminated soil sample of Example 1 was placed into a pressure vessel and the vessel was pressurized with steam to a gage pressure of about 165 psia. Steam and vaporized contaminants were vented to atmospheric pressure. In a second step, steam, soil and vaporized contaminants remaining in the vessel were flashed to a subatmospheric pressure of about 3 psia. A cool, cleaned soil product was then recovered from the vessel and the soil product was analyzed for hydrocarbons using gas chromatography. The soil product was found to contain about 9 ppm fuel oil which calculates to a 99.9% removal of the contaminating fuel oil.

EXAMPLE 3

Another sample of contaminated soil was prepared by mixing the soil with an amount of used motor oil and grease to produce a contaminant level of approximately 9,800 ppm. This sample was treated by the procedure of Example 2 and the cleaned soil product was analyzed using gas chromatography. It was found that the soil product contained about 53 ppm oil and grease which corresponds to a removal of about 99.5% of these less volatile hydrocarbon contaminants.

Although not shown in the drawing, it is preferred that the process be equipped with analytical instrumentation capable of determining the residual contaminant level in the cleaned soil product. In this way, if the soil product goes off specification because of process upset or other reason, the off-specification material need not be returned to the ground site but may be recycled to the beginning of the process, or set aside for rework, and the process operating conditions modified.

While specific embodiments of the invention have been described, other variations will be obvious to those skilled in the art and such variations are within the scope of the disclosed and claimed invention.

I claim:

1. A process for treating soils contaminated with volatile organic compounds comprising the following sequential steps:
    contacting the soil in a closed vessel with steam at superatmospheric pressure and allowing the steam and soil to reach a predetermined temperature objective;
    reducing the pressure about said soil to a lower pressure level by rapidly flashing off steam and vaporized organic compounds;
    condensing the flashed steam and volatile organic compounds contained therein; and
    recovering a cleaned soil product.

2. The process of claim 1 wherein the levels of said superatmospheric and lower pressures are adjusted such that substantially all of the volatile organic compounds are removed from the soil.

3. The process of claim 1 wherein a portion of the steam and vaporized contaminants is bled from said vessel before the pressure is reduced to said lower level.

4. The process of claim 1 wherein the contaminated soil is conditioned to a particulate, free-flowing state having a moisture content between about 5% and 20% before it is contacted with steam.

5. The process of claim 1 wherein the process conditions are set such that the soil product has a moisture content between about 5% and 20%.

6. The process of claim wherein the non-condensible gas stream remaining after said steam and volatile organic compounds have been condensed is subjected to a further treatment to remove residual contaminants therefrom.

7. The process of claim 6 wherein said further treatment comprises mist scrubbing.

8. The process of claim 1 wherein said condensed steam is separated from said condensed volatile organic compounds.

9. The process of claim 1 wherein said superatmospheric pressure is greater than 5 atmospheres.

10. The process of claim 1 wherein said lower pressure is substantially atmospheric.

11. The process of claim 1 wherein said lower pressure is subatmospheric

12. The process of claim 1 wherein said soil, after steam and vaporized organic compounds are flashed therefrom, is transferred from said vessel to a second chamber, wherein said second chamber is maintained at a lower pressure than is said vessel by drawing additional steam and vaporized contaminants therefrom, and wherein a cleaned soil product is thereafter discharged from said chamber.

13. The process of claim 12 wherein said lower pressure is subatmospheric.

14. The process of claim 12 wherein said flashed steam and vaporized organic compounds are condensed in a first condensing zone maintained at substantially atmospheric pressure and wherein said additional steam and vaporized contaminants are condensed in a second condensing zone maintained at a subatmospheric pressure.

15. The process of claim 14 wherein gases and vapors which are not condensed in said second condensing zone are compressed and passed to said first condensing zone.

16. A process for cleaning granular and particulate solids contaminated with organic compounds comprising the following sequential steps:
    contacting said solids with steam at a pressure sufficiently high to cause said contaminant compounds to vaporize and admix with the steam;
    separating the solids from the steam and contaminant compounds by flashing said steam to a lower pressure; and
    recovering a cleaned solids product.

17. The process of claim 16 wherein said steam pressure is greater than 5 atmospheres.

18. The process of claim 16 wherein said flashed steam and vaporized contaminant compounds are condensed.

19. The process of claim 16 wherein said lower pressure is subatmospheric.

20. A process for treating soils contaminated with volatile organic compounds comprising:
    providing a plurality of closed reaction vessels, each of said vessels adapted to receive a soil charge and to hold that charge at superatmospheric pressure;
    conveying charges of said soil to first one and then another of said reaction vessels;
    contacting the soil charge in each said reaction vessel with steam at superatmospheric pressure for a time sufficient for the soil to reach a predetermined temperature objective;
    rapidly reducing the pressure within each said reaction vessel by flashing off steam and volatile organic compounds contained in the steam to a condensing zone maintained at a lower pressure;
    discharging a cleaned soil charge from said reaction vessels; and
    collecting a condensate comprising water and volatile organic compounds from said condensing zone.

21. The process of claim 20 wherein the contaminated soil is conditioned to a particulate, free-flowing state having a moisture content between about 5% and 20% before it is contacted with steam.

22. The process of claim 21 wherein said conditioned soil is pre-heated by heat exchange with flue gas from a boiler generating steam for the process before being charged to said reaction vessels.

23. The process of claim 21 wherein the process conditions are set such that the cleaned soil product has a moisture content between about 5% and 20%.

24. The process of claim 20 wherein non-condensible gases and vapors from said condensing zone are subjected to a further treatment to remove residual contaminant compounds therefrom.

25. The process of claim 24 wherein said treatment comprises mist scrubbing.

26. The process of claim 24 wherein said treatment comprises fume incineration.

27. The process of claim 20 wherein said superatmospheric pressure is greater than 5 atmospheres and wherein said lower pressure is substantially atmospheric.

28. The process of claim 20 wherein said cleaned soil charges are transferred from said reaction vessels to a chamber; said chamber being maintained at a lower pressure than are said reaction vessels by drawing additional steam and vaporized contaminants therefrom.

29. The process of claim 28 wherein said flashed off steam and volatile organic compounds are condensed in a first condensing zone maintained at substantially atmospheric pressure and wherein said additional steam and vaporized contaminants are condensed in a second condensing zone maintained at a subatmospheric pressure.

30. The process of claim 29 wherein means are provided to reduce the pressure in said second condensing zone to a level substantially below atmospheric by drawing vapors and gases from said second condensing zone and discharging said vapors and gases into said first condensing zone.

31. The process of claim 30 wherein said pressure reducing means comprises a steam driven eductor.

32. A method for treating soils contaminated with volatile organic compounds comprising:
continuously feeding a stream of contaminated soil to one end of an elongated reactor vessel;
introducing steam at superatmospheric pressure into said vessel and mixing said steam and soil to vaporize volatile organic compounds carried in the soil;
transporting said soil to the other end of said reactor vessel;
discharging a stream soil and steam from said reactor vessel and thereafter flashing the steam and vaporized contaminants from the soil; and
recovering a cleaned soil product.

* * * * *